United States Patent [19]

Foss et al.

[11] Patent Number: 4,505,495
[45] Date of Patent: Mar. 19, 1985

[54] PORTABLE, FOLDABLE AND CONVERTIBLE LUGGAGE TROLLEY

[75] Inventors: Janet M. P. Foss, Naish Hillhouse, Reybridge, Lacock, Chippenham, Wilts; John Foss, Chippenham; Christopher G. Brooks, Melksham, all of England; Myron H. Ridgely, Waynesboro, Pa.

[73] Assignee: Janet Mary Penrose Foss, England

[21] Appl. No.: 449,824

[22] Filed: Dec. 14, 1982

[51] Int. Cl.³ .............................................. B62B 3/02
[52] U.S. Cl. .................................... 280/651; 16/112; 280/43.17; 280/47.37 R
[58] Field of Search ...................... 280/47.36, 47.37 R, 280/47.37 L, 47.37 C, 47.34, 79.1 R, 30, 638, 639, 641, 651, 659, 43, 43.13, 43.17; 16/112, 123, 126, DIG. 12, DIG. 18, DIG. 19, DIG. 24; 292/150, 147

[56] References Cited

U.S. PATENT DOCUMENTS

| | | | |
|---|---|---|---|
| 2,716,557 | 8/1955 | Gould | 280/641 |
| 2,751,233 | 6/1956 | Racker | 280/641 |
| 3,047,305 | 7/1962 | Kleinschmidt | 280/651 |
| 3,305,243 | 2/1967 | Manfredi | 280/651 |
| 3,762,739 | 3/1973 | Tabet | 280/47.37 |
| 4,114,914 | 9/1978 | Cohen | 280/651 |
| 4,326,731 | 7/1982 | Woychio et al. | 280/641 |

FOREIGN PATENT DOCUMENTS

| | | | |
|---|---|---|---|
| 1559720 | 2/1969 | France | 292/150 |
| 828582 | 3/1957 | United Kingdom . | |
| 810882 | 5/1957 | United Kingdom . | |
| 1385413 | 2/1973 | United Kingdom . | |
| 1528582 | 7/1976 | United Kingdom . | |

Primary Examiner—Joseph F. Peters, Jr.
Assistant Examiner—Joseph G. McCarthy
Attorney, Agent, or Firm—Diller, Ramik & Wight

[57] ABSTRACT

This disclosure relates to a portable, foldable and convertible luggage trolley which includes first and second base supports joined by a pivot so as to be folded between a nested position and a position in side-by-side coplanar relationship, the first and second base supports carrying first and second sets of wheels, another pivot joining a handle to the first base support and still another pivot for pivotally connecting a luggage restraining member to the second base support, a plurality of locks for holding the handle in a position normal to the first base support, the handle being formed by handle members foldable between side-by-side and nested positions, the luggage restraining member further functioning as a carriage for the second set of wheels so that the same can be moved between operative ground engaging and inoperative nonground engaging positions when the first and second base supports are in their respective side-by-side and nested positions, and means for joining one of the handle members to another of the handle members through either a pivoted or a telescopic connection.

25 Claims, 14 Drawing Figures

U.S. Patent  Mar. 19, 1985  Sheet 1 of 4  4,505,495
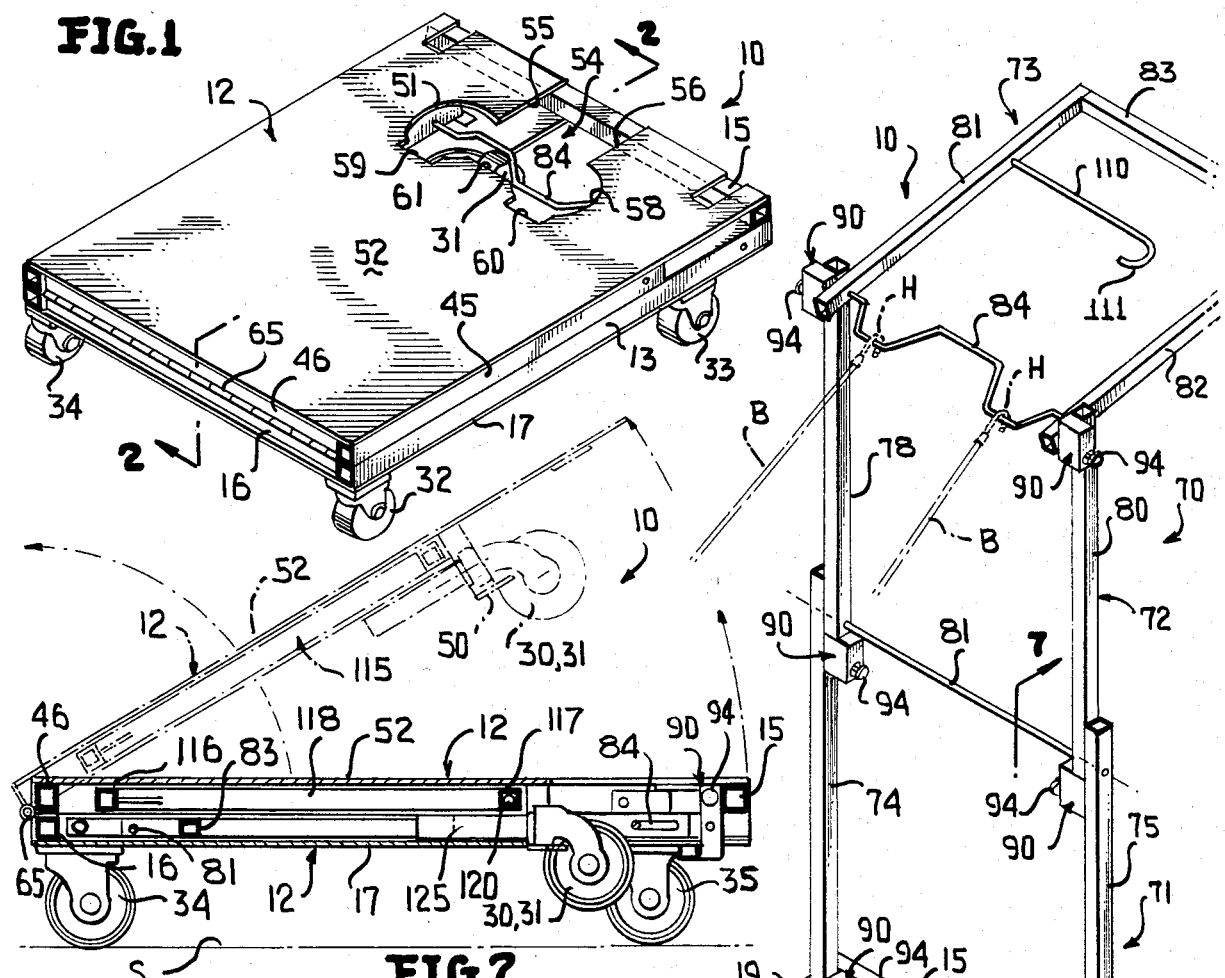
FIG.1
FIG.2
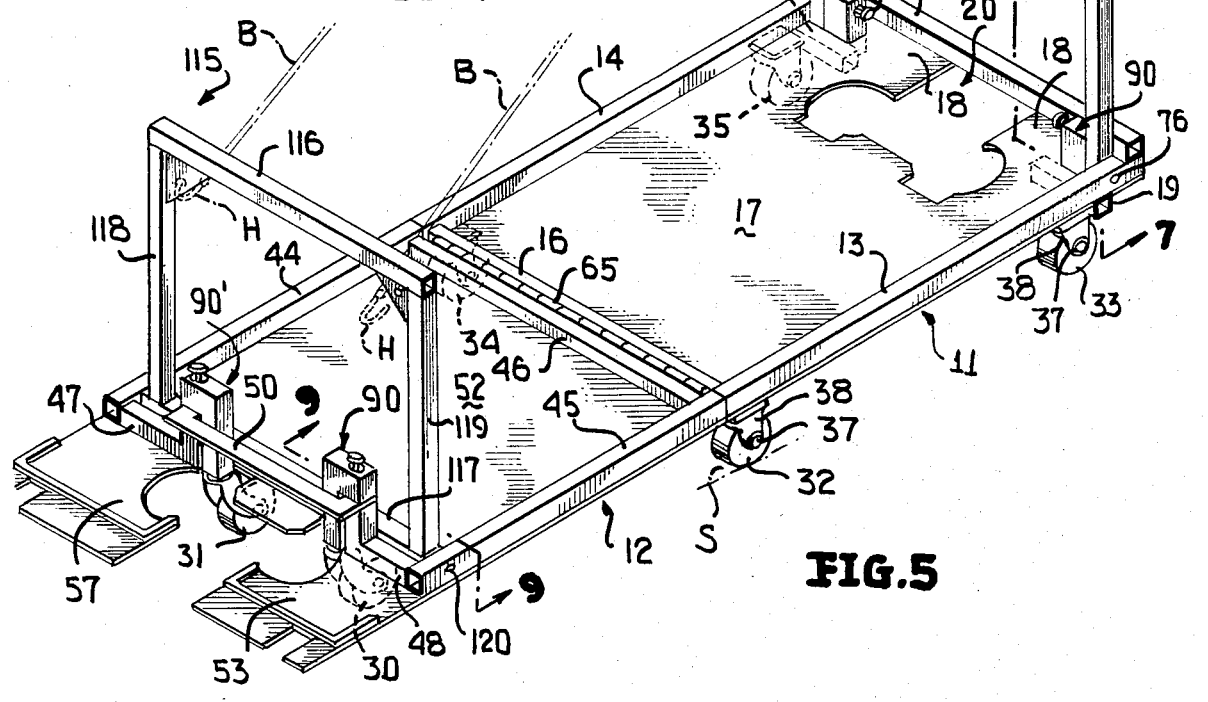
FIG.5

U.S. Patent  Mar. 19, 1985  Sheet 3 of 4  4,505,495
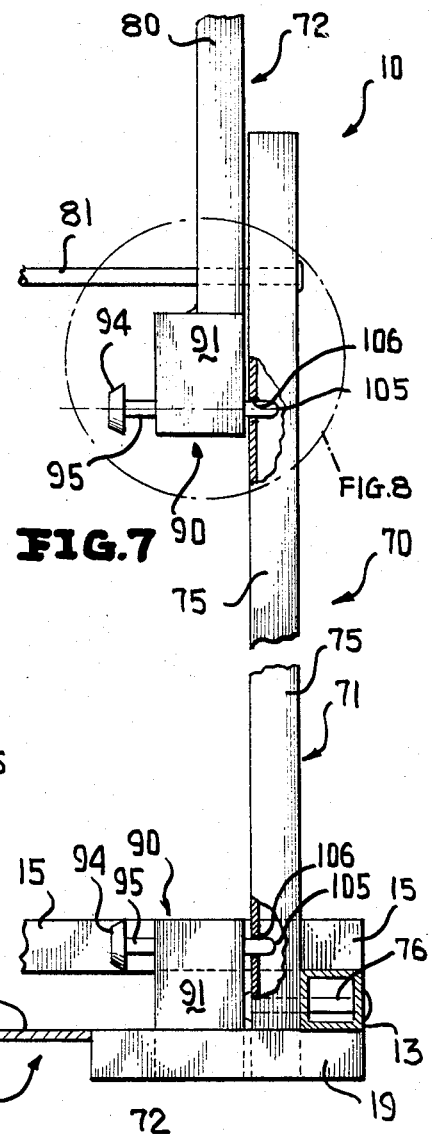
FIG.7
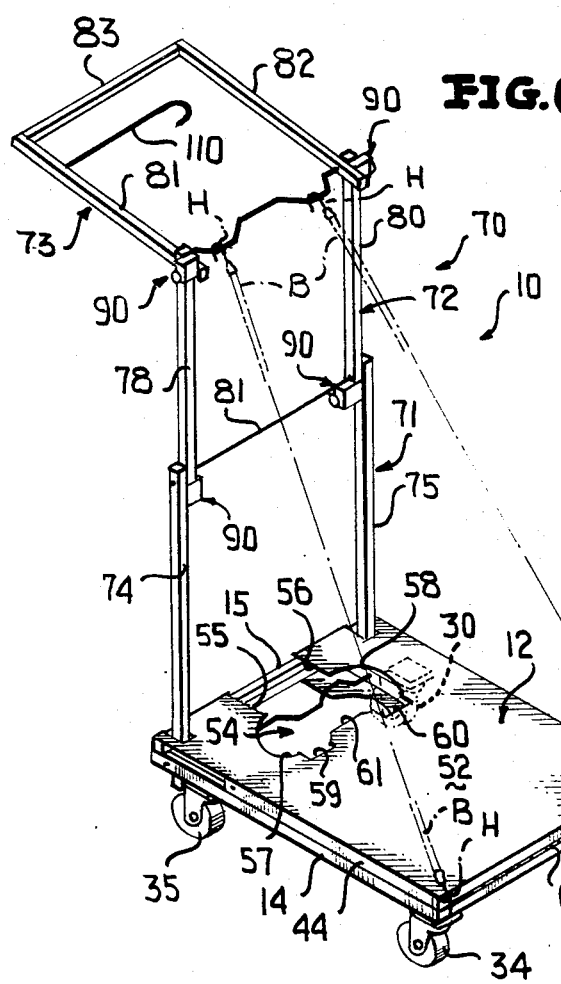
FIG.6
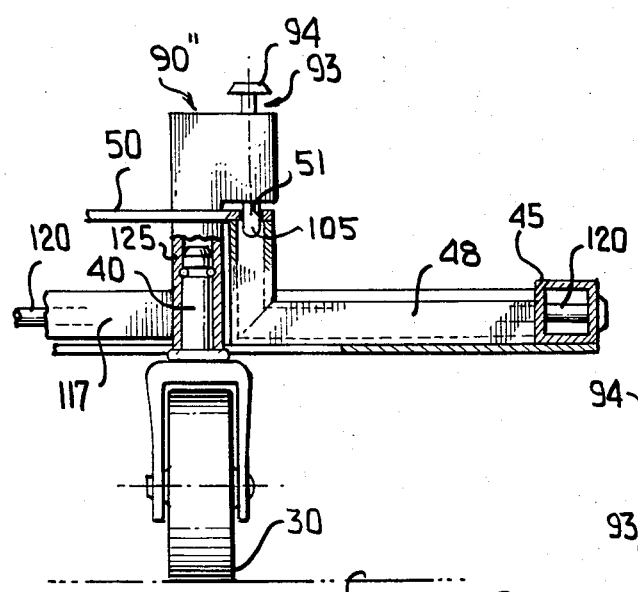
FIG.9
FIG.8

PORTABLE, FOLDABLE AND CONVERTIBLE LUGGAGE TROLLEY

The present invention is directed to a novel portable, foldable and convertible luggage trolley which is particularly designed for accommodating relatively heavy luggage and/or a considerable number of pieces of luggage, yet is relatively light-weight, can be folded to a small size when not in use, and can be converted between two different positions of use to accommodate the size, weight and/or number of articles, baggage or luggage which is transported thereby.

In keeping with the foregoing, a primary object of this invention is to provide a novel portable, foldable and convertible luggage trolley of the type aforesaid which includes first and second base supports joined by first pivot means for pivoting the base supports between side-by-side coplanar and nested positions in both of which luggage can be transported by the trolley, the first and second base supports carrying first and second wheels, handle means defined by at least a pair of handle members pivotally connected to each other and to the first base support by appropriate pivot means, and a luggage restraining member or carriage pivotally connected to the second base support and being movable between a position in nested relationship to the second base support and a position normal thereto, whereby in the latter position luggage can be supported upon both the first and second base supports while in their side-by-side relationship and upon the nesting of the luggage restraining member relative to the second base support and the nested relationship of the latter to the first base support luggage can be supported upon the second base support thereby accommodating luggage varying considerably in size, weight and number of pieces.

Still another object of this invention is to provide a novel luggage trolley as aforesaid wherein the luggage restraining member is part of and is pivotally connected to the second base support and carries the wheels thereof, and the wheels are rendered inoperative and are moved out of ground contacting engagement when the luggage restraining member is disposed in nested relationship to the second base support.

Yet another object of this invention is to provide a novel luggage trolley as aforesaid wherein means are provided for locking the luggage restraining member or carriage in its position generally normal to the second base support.

A further object of this invention is to provide a novel luggage trolley wherein each of the handle members are not only pivotally connected to each other but include locking means for locking adjacent ends of the handle members to each other and the handle member most adjacent the first base support to the latter.

Still another object of this invention is to provide a novel luggage trolley of the type aforesaid wherein a gripping handle of the handle means is mounted in telescopic relationship to its next adjacent handle member.

Still another object of this invention is to provide a novel luggage trolley as aforesaid wherein the locking means include slidably mounted locking pins held by spring-biased detent means in both locked and unlocked positions and in the former of which an end of each locking pin is received in an opening of an associated member.

Still another object of this invention is to provide a novel luggage trolley of the type aforesaid wherein one of the handle member includes a bight and a pair of legs, each leg being formed of two elements joined together by a pivot, the other of a pair of handle members including a pair of tubes, a spring in each tube, a first of each two elements being telescopically received in an associated tube, each spring urging its associated first element into its associated tube, and the second of the two elements having a terminal edge in transverse spanning relationship to an associated tube when the one handle member is disposed with its two leg elements of each of the pair of legs in a position other than an aligned position.

With the above and other objects in view that will hereinafter appear, the nature of the invention will be more clearly understood by reference to the following detailed description, the appended claims and the several views illustrated in the accompanying drawings.

IN THE DRAWINGS

FIG. 1 is a perspective view of a portable, foldable and convertible luggage trolley in accordance with this invention, and illustrates the same in its folded position.

FIG. 2 is a cross-sectional view taken generally along line 2—2 of FIG. 1, and illustrates the manner in which various components of the trolley are nested and in phantom outline the movement of one of the base supports toward its operative luggage supporting position.

FIG. 3 is a top plan view of the luggage trolley, and illustrates two of the base supports in side-by-side relationship in a common plane prior to the unfolding of a luggage restraining member and a handle toward operative positions thereof.

FIG. 4 is a sectional view taken generally along line 4—4 of FIG. 3, and illustrates in phantom outline the manner in which the luggage restraining member and the handle is moved toward operative positions.

FIG. 5 which is on the sheet of drawings containing FIGS. 1 and 2 is a perspective view of the luggage trolley, and illustrates the luggage restraining member or carriage and the handle in an operative position at which luggage can be supported upon both of the base supports.

Figure 6:
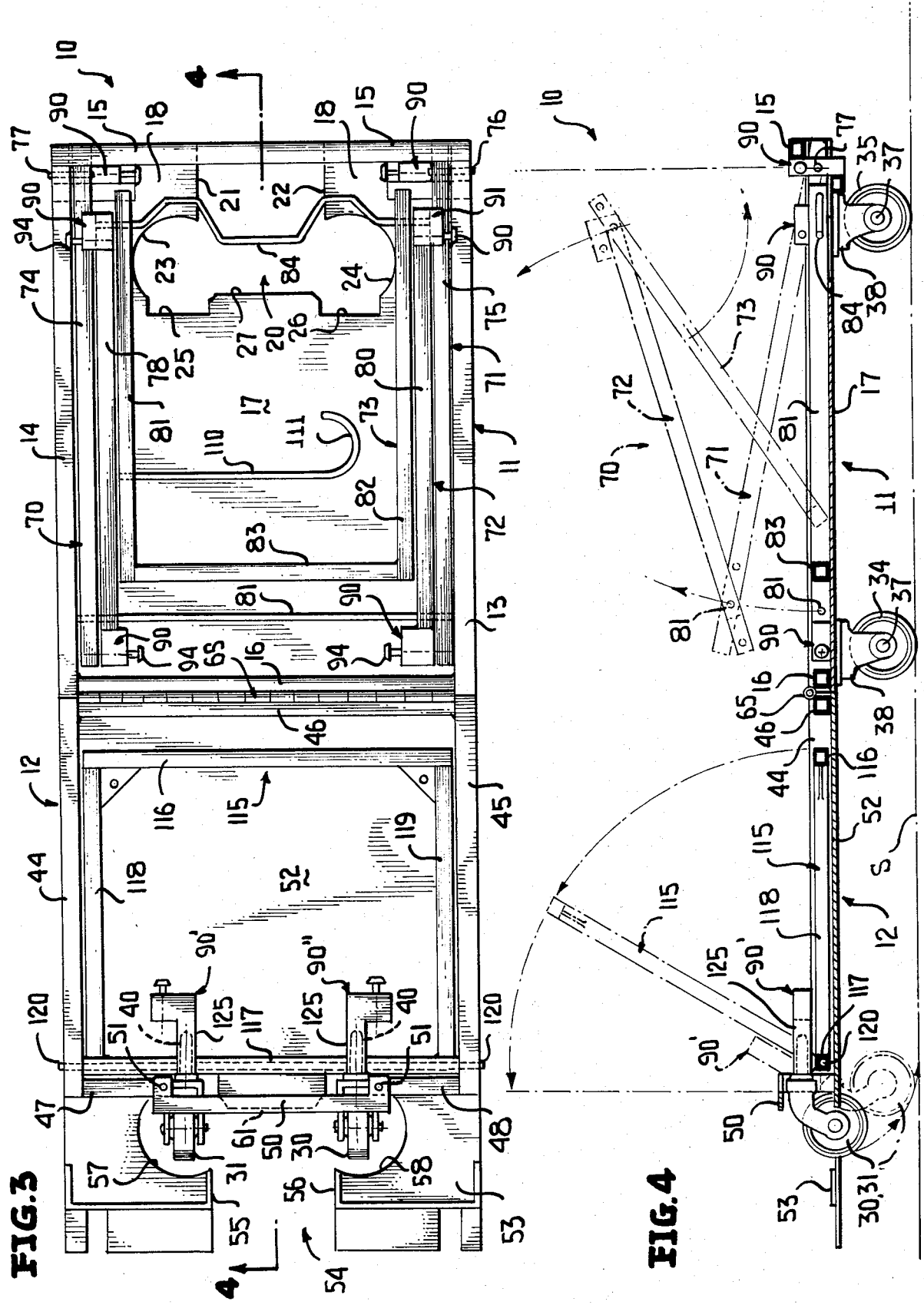

FIG. 6 is a perspective view of the luggage trolley, and illustrates the luggage restraining member and one of the base supports in superposed relationship to an underlying base support for reducing the carrying capacity of the luggage trolley.

FIG. 7 is an enlarged fragmentary sectional view taken generally along line 7—7 of FIG. 5, and illustrates locking means for locking handle members to each other and to one of the base supports.

FIG. 8 is an enlarged fragmentary sectional view of the encircled portion of FIG. 7, but shown in cross-section, and illustrates a spring-biased detent for holding a locking pin in each of its relative locked and unlocked positions and an opening in an adjacent member for receiving a terminal end of the pin in its locked position.

FIG. 9 is an enlarged fragmentary sectional view taken generally along line 9—9 of FIG. 5, and illustrates the manner in which one of a pair of wheels is carried by the luggage restraining member or carriage and is locked in its operative ground-contacting position.

Figure 10:
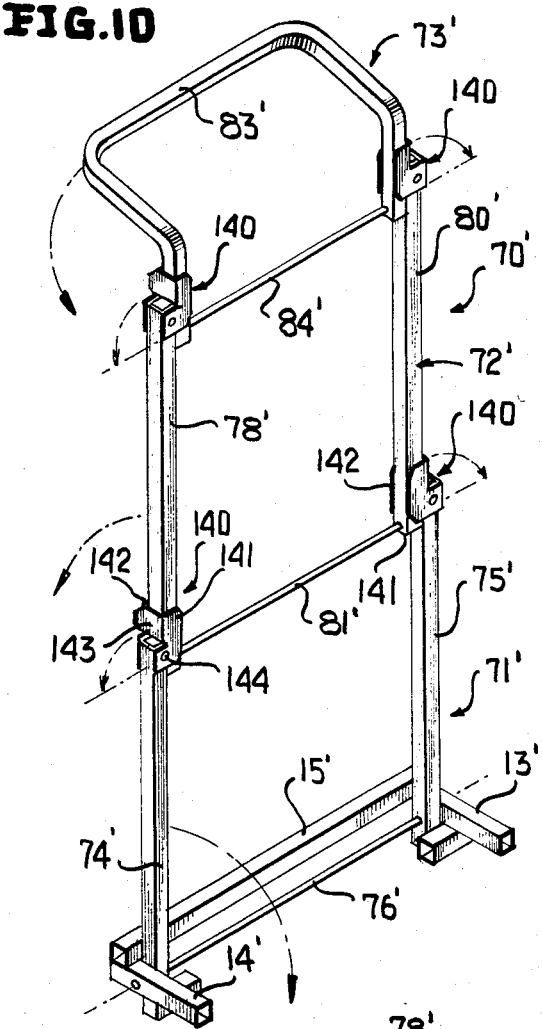

FIG. 10 is a fragmentary perspective view of another embodiment of the invention, and illustrates a handle formed of several handle members pivotally joined to each other and locked by cooperative locking or latching members selectively pivoted thereto.

Figure 11:
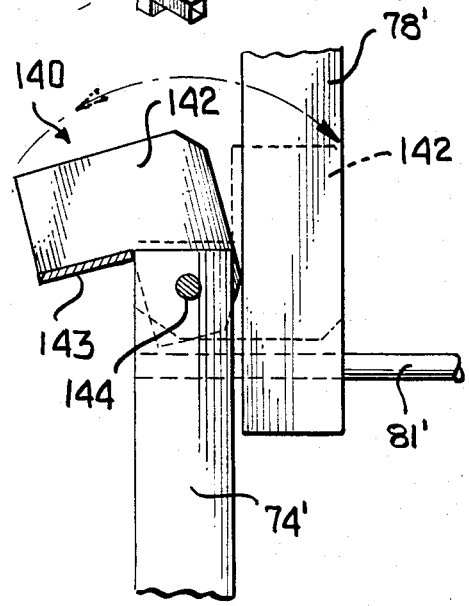

FIG. 11 is a fragmentary side elevational view, partly in cross-section, and illustrates one of the locking members in both its locked and unlocked positions.

Figure 12:
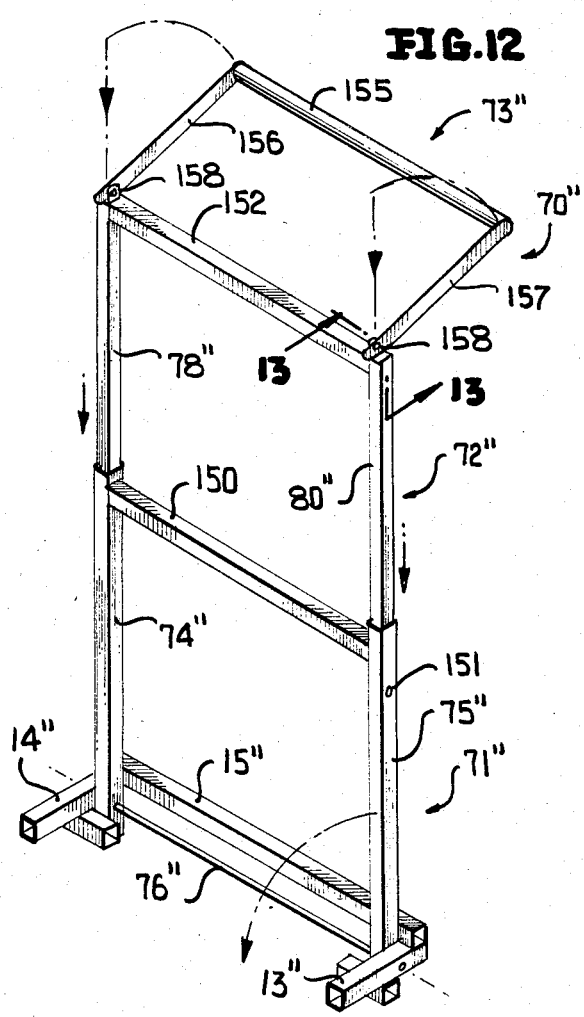

FIG. 12 is a perspective view of another luggage trolley constructed in accordance with the invention, and illustrates a telescopic handle formed of a pair of relatively telescopic handle members.

Figure 13:
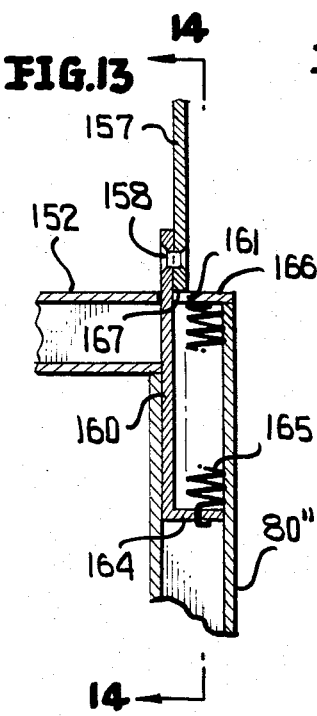

FIG. 13 is an enlarged fragmentary sectional view taken generally along line 13—13 of FIG. 12, and illustrates a hand grip formed of a bight and a pair of legs which can be pivoted and telescoped between operative and inoperative positions thereof.

Figure 14:
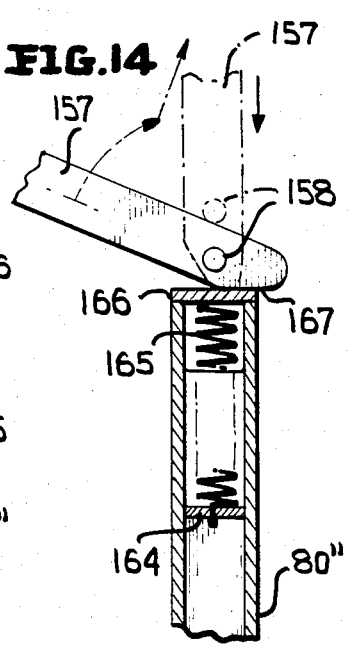

FIG. 14 is a sectional view taken generally along line 14—14 of FIG. 13, and illustrates two positions of one of the legs of the hand grip of the handle of FIGS. 12 and 13.

A portable, foldable and convertible luggage trolley constructed in accordance with this invention is generally designated by the reference numeral 10 and includes a pair of base supports 11, 12 (FIGS. 1 through 5) adapted to be positioned in a generally common horizontal plane in side-by-side coplanar relationship in a first position (FIGS. 3, 4 and 5) and being movable to a second position at which the pair of base supports 11, 12 are generally in stacked or nested relationship relative to each other (FIGS. 1, 2 and 6).

The base support 11 is formed of a pair of hollow square rods 13, 14 disposed in generally parallel relationship to each other, a similar hollow square rod or tube 15 spanning and welded to upper surfaces of the tubes 13, 14 and another hollow rod or tube 16 parallel to the tube 15 and welded to the tubes 13, 14 (FIGS. 3, 4 and 5). A decorator plate 17 contacts the underside of the tubes 13, 14 and 16 and is welded thereto. A right-handmost edge 18 of the plate 17 defines an irregularly shaped opening 20 which is defined by two spaced parallel edges 21, 22, adjacent arcuate edges 23, 24, respectively, two shallow generally U-shaped edges 25, 26 and an edge 27 bridged therebetween. The opening 20 functions as means for receiving wheel or wheel means 30, 31 of the base support 12 when the latter is pivoted to its position atop the base support 11 in the manner best illustrated in FIG. 2, noting that the wheels 30 (and 31) project through the respective openings 24, 26 (and 23, 25) but do not contact a supporting surface S, as will be described more fully hereinafter.

The base support 11 is supported by four wheels or wheel means 32 through 35 (FIG. 5) which are mounted for rotation on identical horizontal shafts 37 of identical brackets or casters 38 mounted in a conventional manner for pivoting through 360 degrees about a vertical axis through the utilization of a vertical shaft 40 (FIG. 9), as in the case of the wheels 30, 31. The wheels 32 through 35, the brackets 38, etc., are conventional hardward and the specific details thereof form no part of the present invention.

The second base support 12 is formed by a pair of hollow generally square tubes or rods 44, 45 disposed in parallel relationship to each other and being welded at one end to a transverse rod 46. Remote from and generally parallel to the hollow tube or rod 46 is a pair of spaced generally L-shaped hollow tubes 47, 48 welded to the tubes 44, 45 and being bridged by a narrow generally U-shaped plate 50 whose ends have openings 51 (FIG. 9) in alignment with the upwardly projecting ends of the tubular rods or tubes 47, 48 (FIG. 9). The U-shaped plate 50 is preferably welded to the upper end of the tubes 47, 48. As in the case of the base support 11, the base support 12 has welded to the underside of the tubes 44, 45, 46, 47 and 48 a decorator plate 52 whose left-handmost edge 53, as viewed in FIGS. 3 and 5, is cut away by a slot 54 of an irregular configuration including a pair of edges 55, 56 in generally parallel relationship to each other, two arcuate edges 57, 58, respectively, two shallow U-shaped edges 59, 60 (FIG. 6) and an edge 61 therebetween. The purpose of the slot 54 and particularly the arcuate portions provided by the edges 57, 58 is to allow the wheels 30, 31 to move through the decorator plate 52 between positions of use in contact with the surface S (FIG. 4, in phantom outline and 5) and positions of nonuse (FIGS. 1, 2 and 3).

The base supports 11 and 12 are joined to each other by first pivot means 65 in the form of a relatively long piano hinge welded or otherwise joined to the tubes 16, 46. When the base supports 11, 12 are in the side-by-side coplanar position shown in FIG. 5, luggage can be placed upon both of the supports 11, 12, but upon the base support 12 being pivoted about the pivot means 65 to the position shown in FIG. 6, luggage can simply be placed atop the plate 52 of the base support 12. In this manner, the pivot means 65 permits the luggage trolley 10 to be conveniently converted for use with greater (FIG. 5) or lesser (FIG. 6) pieces of luggage.

Irrespective of the particular in-use position of the luggage trolley 10, be it FIG. 5 or FIG. 6, the same includes handle means generally designated by the reference numeral 70 defined by a first handle member 71, a second handle member 72 and a third handle member 73. The handle member 71 is formed by two generally parallel hollow rods or tubes 74, 75 pivotally connected by pivot means or pins 76, 77 (FIG. 3) to the respective tubes 13, 14 of the base support 11. Likewise, the handle member 72 includes a pair of hollow generally rectangular rods or tubes 78, 80 connected by pivot means in the form of a pivot rod 81 to upper end portions (unnumbered) of the tubes 74, 75.

The handle member 73 is similarly defined by a pair of generally square tubes or rods 81, 82 joined by a bight or hand grip 83 and pivotally connected by a generally square-waved shaped pivot pin or rod 84 which passes through the tubes 81, 82 and is connected to upper end portions (unnumbered) of the tubes 78, 80.

The distance between the outside surfaces of the tubes 81, 82 is generally equal to, though slightly less than, the distances between the inside surfaces of the rods or tubes 78, 80, while the distance between the outside surfaces of the tubes 78, 80 is generally equal to or slightly less than the distance between the inside opposing surfaces of the tubes 74, 75. Due to the latter-noted dimensioning, the handle member 73 can pivot about its pivot pin 84 into nested relationship between the tubes 78, 80 of the handle member 72 while the handle member 72 can likewise be moved within and between the tubes 74, 75 of the handle member 71. The latter can, of course, likewise nest between the tubes 13, 14 of the base support 11, as is best illustrated in FIG. 3 which shows the fully collapsed and stowed position of the handle or handle means 70 upon the base support 11 and within the area defined by the tubes 13 through 16.

Reference is made particularly to FIGS. 7 and 8 of the drawings which illustrate locking means which, since they are identical, are generally designated by the reference numeral 90. The locking means 90 include housings 91 which are shown welded to the lower end portion (unnumbered) of the tube 80 and to the tube 15, as well as a short tube 19 which underlies and is welded to the edge 18 to either side of the slot 20. Each housing 91 includes a generally circular bore 92 in which is slidably received a locking pin 93 (FIG. 8) having an exteriorly exposed handle 94 and a stem 95. The stem 95 includes a pair of integral annular shoulders 96, 97 of a diameter matching the diameter of the bore 92 so that the pin 93 can be readily moved between unlocked (solid outline in FIG. 8) and locked (phantom outline in FIG. 8) positions. A central portion of the stem 95 is enlarged as an annular or peripheral tapered shoulder 98, and the shoulder 98 defines with the annular ribs 96, 97 respective detent-receiving annular channels 100, 101 which selectively receive a locking detent 102 biased by a spring 103 radially outwardly from a blind bore 104 toward the axis of the pin 93. When the detent 102 lies in the channel 101, the pin is held in its unlocked position, whereas if the pin is pushed to its phantom outline position, the detent will fall into the channel 100 and hold the locking pin with a locking terminal nose 105 thereof seated in an opening 106 formed in a wall (unnumbered) of the tube 75. Thus, with the locking noses 106 held in their retracted position (solid outline in FIG. 8), the handle members 71, 72, 73 can be readily folded from their nested to their in-use position and vice verse and in the latter, the various tubes can be locked together against pivoting upon the noses 105 being received in the associated openings 106 of the various tubes 74, 75; 78, 80 and 73, 81, as is readily apparent from FIG. 5 which shows all of the locking means 90 positioned with their respective locking pins 93 in the phantom outline position shown in FIG. 8 to maintain the handle means 70 locked in the position shown in FIG. 5. However, upon pulling all of the locking pins 93 outwardly to their solid outline positions (FIG. 8), the handle 70 can be folded to the nested position best shown once again in FIG. 3.

A generally J-shaped hook 110 is connected to the tube 81 and terminates in a curved end 111. This permits items such as tote bags, shoulder bags, camera carrying cases and the like to be hung from the hook 110 to free the hands of the user to grip the tube 83 while pushing the trolley as need be during its operation. The curved end 111 prevents such articles hanging from the J-shaped hook 110 from falling therefrom.

The base support 12 further includes means for restraining luggage upon the base support 12 while also functioning as a carriage for the wheels 30, 31, the latter-noted luggage restraining means and/or carriage being generally designated by the reference numeral 115. The carriage or member 115 includes a pair of generally parallel tubular rods 116, 117 which are welded to similar parallel tubes or rods 118, 119, with the distance between the outer surfaces of the latter corresponding generally to the distance between the inner surfaces of the tubes 44, 45 such that the member 115 can be nested within the base support 12, as is best illustrated in FIG. 3 of the drawings. The luggage restraining member or carriage 115 can be pivoted between its nested position and its upright position (FIG. 5) by means of a pivot pin 120 in the form of a rod which passes through the tube 117 and is connected to the tubes 44, 45 (FIGS. 3 and 5).

Locking means 90', 90" (FIGS. 3, 5 and 9) are so identified because they are virtually identical to the locking means 90 heretofore described. However, locking means 90', 90" include respective tubular stems 125 (FIGS. 3 and 9) which are welded to the tube 117 and, therefore, are movable therewith when the luggage restraining member or carriage 115 is moved between the nested position (FIG. 3) and the in-use or upright position (FIG. 5) and vice versa. In the latter position, the locking noses 106 of the locking means 90', 90" are in alignment with and enter into the openings 51 (FIGS. 3 and 9) in the plate 50 thereby locking the luggage restraining member 115 in its upright position. The stems 125 further received the vertical shaft 40 of the wheels 30, 31 and thus upon the pivoting movement of the carriage or luggage restraining member 115 between the positions just defined, the wheels 30, 31 likewise move through the slot 54 (FIG. 3) and particularly the areas defined by the curved or arcuate edges 57, 58 to move the wheels between their ground-contacting position (FIG. 5) and their nonground-contacting position (solid lines in FIG. 4). Obviously, to pivot the carriage 115 from the position shown in FIG. 5 to that shown in FIGS. 3 and 4, the handles 94 need but be pulled outwardly to withdraw the locking noses 105 from the openings 51.

In FIG. 5, luggage may be placed upon both of the base supports 11 and 12 and, of course, the member 115 functions to prevent luggage from falling forwardly and possibly off the base support 12 as could occur in the absence of the luggage restraining member 115 if, for example, forward motion of the luggage trolley 10 were abruptly stopped by the wheels 30, 31 encountering a less than smooth surface. Furthermore, to prevent such inadvertent loss of luggage pieces, straps, bungee cords or like tie-downs can be connected between the luggage restraining member 115 and particularly the tube 116 thereof and the pivot pin or rod 84 which is particularly curved in a sinusoidal or square-waved pattern to facilitate the securement of straps, ropes, or the hooks of bungee cords (not shown) particularly to the U-shaped portions (unnumbered) of the rod 84 opening toward the J-shaped hook 110.

While the luggage trolley of FIG. 5 is shown to accommodate maximum luggage, the same is readily convertible to the configuration shown in FIG. 6 simply by releasing the locking means 90', 90", folding the luggage restraining member 115 into its nested position (FIG. 3) and thereafter pivoting the base support 12 about the pivot means 65 to bring the base support 12 into overlying/nested relationship to the base support 11. During the latter-noted folding, the wheels 30, 31 will pass upwardly through the slot 54, as is most readily visualized from FIG. 4, as the luggage restraining member 115 is pivoted about the pivot pin or rod 120. Furthermore, as the base support 12 is pivoted toward the base support 11, the wheels 30, 31 will tend to swing under the influence of gravity from their positions partially projecting through the arcuate portions 57, 58 of the slot 54 to a position totally outboard of these same slot portions, as is most evident in the phantom outline position of the base support 12 and the associated wheel 30 shown in FIG. 2. Furthermore, as the base support approaches its fully nested position (solid lines in FIG. 2), the wheels 30, 31 will pass through the slot 20 and particularly the arcuate portions 24, 23, respectively, to a position in which the wheels 30, 31 will not contact the surface S (FIG. 2) nor will they interfere should, for example, luggage be placed atop the plate 52 (FIG. 6). Thus, in the converted position shown in FIG. 6 and the storage position in FIG. 1, the wheels 30, 31 are in an out-of-the way stored position or condition. When the luggage trolley 10 is in the position shown in FIG. 1, any appropriate means may be utilized to releasably secure the base supports 11, 12 to each other, and it is to be particularly noted that in this position, the decorator plates 17, 52 substantially enclose the various elements sandwiched therebetween thus lending an attractive and aesthetic appearance to the luggage trolley 10 in its folded or stowed condition (FIG. 1).

Reference is now made to FIGS. 10 and 11 of the drawings which illustrate an embodiment of the invention with respect to handle means 70' and more specifically locking means 140. The handles 70' has been primed to indicate structure corresponding to that of the handle 70, as, for example, the corresponding handle members 71', 72', 73' and the various tubes 74', 75', 78', 80', 83', and pivot means or rods 76', 81', and 84'. When the locking means 140 are in the position shown in FIG. 10, the handle 70' can not fold to its nested condition, but upon movement of the locking means 140 from the phantom outline to the solid outline position shown in FIG. 11, each of the handle members 71', 72' and 73' can be appropriately pivoted to a nested condition (not shown) corresponding to that of the handle 70 best shown in FIG. 3.

Each of the locking means 140 is identical and includes a generally U-shaped locking member defined by two side plates 141, 142 joined by a bight portion 143 with a pin 144 passing through the side plates 141, 142 and connecting the locking means 140 to the various tubes 74', 75', 78' and 80 . Hence, in the solid line position in FIG. 11, the tubes 74', 78' can freely pivot relative to each other by virtue of the pivot pin 81'. However, upon movement of the locking means 140 to the phantom outline position shown in FIG. 11, the side plates 141, 142 thereof embrace the tubular rod or tube 78' and prevent relative pivoting movement between the tubes 74', 78'. Hence, in lieu of the locking means 90 associated with the handle 70, the handle 70 may instead be provided with the locking means 140.

Reference is made to FIGS. 12 through 14 of the drawings wherein another handle has been double primed numerically for ease of identification relative to parts similar or identical to those of the handle 70. In this case, a handle or handle means 70" includes handle members 71", 72" and 73". The handle member 71" includes tubes 74" and 75" joined by a pivot pin or rod 76" to tubes 13" and 14". The latter permits the handle member 71" to be pivoted from its upright position to a position nested between the tubes 13", 14". A tube 150 spans and is welded to upper portions of the tubes 74" and 75".

The handle member 72' includes tubular rods 78" and 80", but in lieu of connecting these by a pivot to the respective tubes 74" and 75", the rods 78", 80" are telescopically received within the rod 74" and 75". Appropriate conventional locking means 151 associated with the tubes 74" (not shown) and 75" hold the handle members 71", 72" in their extended position (shown). However, upon operating the conventional spring locking means 151, the rods or tubes 78", 80" can be telescoped virtually entirely within the rod 74" and 75", respectively, incident to nesting the latter within and between the tubes 13", 14". The rods 78" and 80" are preferably bridged for reinforcment purposes by a hollow rectangular tube 152 welded therebetween.

The handle member 73" includes a hand grip portion 155 welded to a pair of legs 156, 157, and each of the latter are connected by a pivot pin 158 to a further leg 160 (FIGS. 13 and 14) which passes through a slot 161 in the tube 152 and has a flange 164 which confines a spring 165 between the flange 164 and an upper wall portion 166 of the tube 152 adjacent the slot 161. The spring 165 and a like spring (not shown) associated with the tube 78" normally urges the legs 160 downwardly within the tubes 78" and 80".

Hence, when the handle member 73" is in its use position (solid lines in FIGS. 12 and 14), an end face 167 of each of the legs 156, 157 will seat upon the end wall 166 of the tube 152 in spanning relationship to the slot 167. The handle member 73" will be held in this position under the influence of the spring 165 forcefully pulling the leg 160 downwardly within each of the tubes 78", 80", thus holding the handle 73" biasingly, yet firmly, in its use (solid outline) position. However, should it be desired to fold the handle to its nonuse position, the handle is merely pivoted in a clockwise direction, as viewed in FIG. 14, against the force of the springs 165, drawn slightly upwardly, and thereafter the handle can be positioned with its legs 156, 157 aligned with its legs 160, 160 and with the latter being aligned with respective tubes 78", 80" after which a downward force will progressively introduce the legs 156, 157 entirely into the upper end portions of the tubes 78" and 80", respectively, until the hand grip 155 is essentially adjacent the tube 152. During this movement, the spring 165 is, of course, carried by the leg 160 in each of the tubes 78", 80" while a retracting operation reversing that just described will bring the spring 165 in each tube 78", 80" to its position bearing against the overlying wall 166. Hence, the handle 70" is moved to its nesting position by a telescopic action in lieu of the pivoting action heretofore described relative to the handles 70, 70'.

Reference is made to FIGS. 5 and 6 which depict in phantom outline the manner in which bungee cords or straps B having hooks H are utilized in connection with the luggage trolley in the two operative positions thereof (FIGS. 5 and 6). In FIG. 5 the hooks H of the bungee cords B are connected to the U-shaped portions (unnumbered) of the rod 84, as was heretofore described. These bungee cords B are crossed or centrally joined (not shown) and opposite hooks H can be received in openings (unnumbered) of brackets (also unnumbered) between the tubes 116, 118 instead of merely being wrapped around the tube 116. In FIG. 6 the hooks H are preferably connected by inserting ends (unnumbered) thereof into the open ends of the tubes 44, 45.

Although only a preferred embodiment of the invention has been specifically illustrated and described herein, it is to be understood that minor variations may be made in the apparatus without departing from the spirit and scope of the invention, as defined in the appended claims.

What is claimed is:

1. A portable, foldable and convertible luggage trolley comprising at least first and second base supports adapted to be disposed in a generally common horizontal plane in side-by-side relationship in a first position of use and being movable to a second position at which the first and second base supports are generally in overlying/underlying relationship to each other with said second base support above said first base support, first pivot means contiguous adjacent sides of said first and second of base supports for effecting pivotal movement therefore between said first and second positions, first and second wheel means carried by said respective first and second base supports for collectively supporting said trolley when said first and second base supports are in said first position, said second wheel means being inoperative in said second position of use at which said first wheel means are operative for supporting said trolley, a handle adapted to be disposed normal to said base supports in both said first and second positions and also in nested generally coplanar relationship to said first base support in said second position, second pivot means contiguous a side of said first base support remote from said first pivot means for effecting pivotal movement of said handle between said normal and nested positions thereof whereby said trolley can be converted between at least two use positions in which said handle is normal to the base supports in both the first and second positions thereof and a nonuse position in which said hanle is in nested generally coplanar relationship to said first base support in said second position, a luggage restraining member adapted to be disposed normal to said first and second supports in said first position and also in nested generally coplanar relationship to said second base support in said second position and third pivot means contiguous a side of said second base support remote from said first pivot means for effecting pivotal movement of said luggage restraining member between said normal and nested positions thereof.

2. The luggage trolley as defined in claim 1 wherein said first, second and third pivot means have generally parallel axes.

3. The luggage trolley as defined in claim 1 wherein said handle includes at least a pair of handle members, a first of said handle members being pivotally connected to said first base support by said second pivot means, and fourth pivot means for effecting pivotal movement between said first handle member and a second of said handle members for relative movement between a side-by-side position normal to said base supports in both said first and second positions and a nested position relative to each other and to said base supports in said second position.

4. The luggage trolley as defined in claim 1 wherein said handle includes at least a pair of handle members, a first of said handle members being pivotally connected to said first base support by said second pivot means, and relative telescopic means for effecting telescopic reciprocal movement between said first handle member and a second of said handle members for relative movement between a side-by-side telescopically extended position generally normal to said base supports in both said first and second positions and a telescopically retracted nested position relative to each other and to said base supports in said second position.

5. The luggage trolley as defined in claim 1 wherein said handle includes at least first, second and third handle members, said first handle member being pivotally connected to said first base support by said second pivot means, and fourth and fifth pivot means for effecting pivotal movement between said first and second handle members and said second and third handle members, respectively, for relative movement between side-by-side positions normal to said base supports in both said first and second positions and a nested position relative to each other and to said base supports in said second position.

6. The luggage trolley as defined in claim 1 wherein said handle includes at least first, second and third handle members, said first handle member being pivotally connected to said first base support by said second pivot means, fourth and fifth pivot means for effecting pivotal movement between said first and second handle member and said second and third handle members, respectively, for relative movement between side-by-side positions normal to said base supports in both said first and second positions and a nested position relative to each other and to said base supports in said second position, and said second and third handle members are of progressively lessening width relative to said first handle member whereby when nested said third handle member nests within said second handle member and said second handle member nests within said first handle member.

7. The luggage trolley as defined in claim 1 wherein said handle includes at least a pair of handle members, a first of said handle members being pivotally connected to said first base support by said second pivot means fourth pivot means for effecting pivotal movement between said first handle member and a second of said handle members for relative movement between a side-by-side coplanar position normal to said base supports in both said first and second positions and a nested position relative to each other and to said base supports in said second position, means locking said first and second handle members together in said side-by-side coplanar position, said locking means including a housing in which slides a locking pin between first and second respective unlocked and locked positions, said housing being carried by one of said handle members, and an opening in the other of said handle members which receives said locking pin in the second locked position thereof.

8. The luggage trolley as defined in claim 1 wherein said handle includes at least a pair of handle members, a first of said handle members being pivotally connected to said first base support by said second pivot means, fourth pivot means for effecting pivotal movement between said first handle member and a second of said handle members for relative movement between a side-by-side coplanar position normal to said base supports in both said first and second positions and a nested position relative to each other and to said base supports in said second position, means locking said first and second handle members together in said side-by-side coplanar position, said locking means including a housing in which slides a locking pin between first and second respective unlocked and locked positions, said housing being carried by one of said handle members, an opening in the other of said handle members which receives said locking pin in the second locked position thereof, and means yieldably resisting the movement of said locking pin between said locked and unlocked positions.

9. The luggage trolley as defined in claim 1 wherein said handle includes at least a pair of handle members, a first of said handle members being pivotally connected to said first base support by said second pivot means, fourth pivot means for effecting pivotal movement between said first handle member and a second of said handle members for relative movement between a side-by-side coplanar position normal to said base supports in both said first and second positions and a nested position relative to each other and to said base supports in said second position, means locking said first and second handle members together in said side-by-side coplanar position, said locking means including a housing in which slides a locking pin between first and second respective unlocked and locked positions, said housing being carried by one of said handle members, an opening in the other of said handle members which receives said locking pin in the second locked position thereof, and spring-biased detent means for holding said locking pin in said locked and unlocked positions.

10. The luggage trolley as defined in claim 1 wherein said handle includes at least a pair of handle members, a first of said handle members being pivotally connected to said first base support by said second pivot means, fourth pivot means for effecting pivotal movement between said first handle member and a second of said handle members for relative movement between a side-by-side coplanar position normal to said base supports in both said first and second positions and a nested position relative to each other and to said base supports in said second position, means locking said first and second handle members together in said side-by-side coplanar position, said locking means includes a housing in which slides a locking pin between first and second respective unlocked and locked positions, said housing being carried by one of said handle members, an opening in the other of said handle members which receives said locking pin in the second locked position thereof, spring-biased detent means for holding said locking pin in said locked and unlocked positions, said spring-biased detent means including a spring and a detent, a bore having an axis disposed transversely of said locking pin, said spring being housed in said bore, and said detent being at least partially housed in said bore.

11. The luggage trolley as defined in claim 1 wherein said handle includes at least a pair of handle members, a first of said handle members being pivotally connected to said first base support by said second pivot means, fourth pivot means for effecting pivotal movement between said first handle members and a second of said handle members for relative movement between a side-by-side coplanar position normal to said base supports in both said first and second positions and a nested position relative to each other and to said base supports in said second position, means locking said first and second handle members together in said side-by-side coplanar position, said locking means including a housing in which slides a locking pin between first and second respective unlocked and locked positions, said housing being carried by one of said handle members, an opening in the other of said handle members which receives said locking pin in the second locked position thereof, spring-biased detent means for holding said locking pins in said locked and unlocked positions, said spring-biased detent means including a spring and a detent, a bore having an axis disposed transversely of said locking pin, said spring being housed in said bore, said detent being at least partially housed in said bore, and a pair of recess means carried by said locking pin for receiving said detent in said locked and unlocked positions.

12. The luggage trolley as defined in claim 1 wherein said second wheel means is carried by said luggage restraining member, and said second wheel means being in ground contact when said luggage restraining member is in said first position and out of ground contact when said luggage restraining member is in said nested position.

13. The luggage trolley as defined in claim 1 wherein said second wheel means is carried by said luggage restraining member, said second wheel means being in ground contact when said luggage restraining member is in said first position and out of ground contact when said luggage restraining member is in said nested position, and means for locking said luggage restraining member in said first position.

14. The luggage trolley as defined in claim 1 wherein said second wheel means is carried by said luggage restraining member.

15. The luggage trolley as defined in claim 14 including a supporting plate defining an upper supporting surface of said second base support when said second base support is above said first base support and a lowermost surface when said first and second base supports are in said first position, and means for defining an opening in said supporting plate through which said second wheel means pass during the movement of said luggage restraining member between said first and second positions thereof.

16. The luggage trolley as defined in claim 15 including a plate defining a surface of said first base support, and means for defining an opening in said first base support plate through which said second wheel means pass during the movement of said second base support to said position thereof above said first base support.

17. The luggage trolley as defined in claim 16 wherein said opening means are generally aligned in said second position of said base supports 18. A portable, foldable and convertible luggage trolley comprising at least a pair of base supports adapted to be disposed in a generally common horizontal plane in side-by-side relationship in a first position of use and being movable to a second position at which the pair of base supports are generally in nested relationship to each other with said second base support above said first base support, first pivot means contiguous adjacent sides of said pair of base supports for effecting pivotal movement thereof between said first and second positions, first and second wheel means carried by respective first and second of said pair of base supports for collectively supporting said trolley when said pair of base supports are in said first position, said second wheel means being inoperative in said second position of use at which said first wheel means are operative for supporting said trolley, a handle adapted to be disposed normal to said base supports in both said first and second positions and also in nested relationship to said base supports in said second position, second pivot means contiguous a side of said first base support remote from said first pivot means for effecting pivotal movement of said handle between said normal and nested positions thereof whereby said trolley can be converted between at least two use positions in which said handle is normal to the base supports in both the first and second positions thereof and a nonuse position in which said handle is in nested relationship to said base supports in said second position, means for mounting said second wheel means for pivoting movement through a plane of said second base support between first and second positions at generally opposite sides of said last-mentioned plane, said second wheel means occupying a first of said latter positions when said base supports are in said common horizontal plane, said second wheel means occupying a second of said latter positions when said base supports are nested, and means defined by said first base support for receiving said second wheel means when said base supports are in said second position.

19. The luggage trolley as defined in claim 17 wherein said second wheel means mounting means include an axis about which said second wheel means is free to rotate, and said second wheel means mounting means are constructed and arranged for disposing said second wheel means mounting means axis generally vertically in said base supports first position and generally horizontally in said base supports second position.

20. The luggage trolley as defined in claim 19 including a luggage restraining member adapted to be disposed normal to said first and second supports in said first position and also in nested relationship to said second base support in said second position, said second wheel means and the mounting means therefor being carried by said luggage restraining member, and third pivot means contiguous a side of said second base support remote from said first pivot means for effecting pivotal movement of said luggage restraining member about a generally horizontal axis between said normal and nested positions thereof.

21. The luggage trolley as defined in claim 20 wherein said second wheel mmeans mounting means axis and said third pivot means axis are disposed normal to each other when said second wheel means mounting means axis is disposed both generally vertically and generally horizontally.

22. The luggage trolley as defined in claim 18 including a supporting plate defining an upper supporting surface of said second base support when said second base support is above said first base support and a lowermost surface when said first and second base supports are in said first position thereof, and means for defining an opening in said support plate through which said second wheel means pass during the movement of said second base support from said second to said first positions thereof relative to said first base support.

23. The luggage trolley as defined in claim 22 including a plate defining a surface of said first base support, and means for defining an opening in said first base support plate through which said second wheel means pass during the movement of said second base support to said second position thereof above said pivot base support.

24. The luggage trolley as defined in claim 23 wherein said opening means are generally aligned in said second position of said base supports.

25. A portable, foldable and convertible luggage trolley comprising at least a pair of base supports adapted to be disposed in a generally common horizontal plane in side-by-side relationship in a first position of use and being movable to a second position at which the pair of base supports are generally in nested relationship to each other, first pivot means contiguous adjacent sides of said pair of base supports for effecting pivotal movement thereof between said first and second positions, first and second wheel means carried by respective first and second of said pair of base supports for collectively supporting said trolley when said pair of base supports are in said first position, a handle adapted to be disposed normal to said base supports in both said first and second positions and also in nested relationship to said base supports in said second position, second pivot means contiguous a side of said first base support remote from said first pivot means for effecting pivotal movement of said handle between said normal and nested positions thereof whereby said trolley can be converted between at least two use positions in which said handle is normal to the base supports in both the first and second positions thereof and a nonuse position in which said handle is in nested relationship to said base supports in said second position, said handle includes a pair of handle members, one of said handle members including a bight and a pair of legs, each leg being formed of two elements joined together by a pivot, the other of said pair of handle members including a pair of tubes, a spring in each tube, a first of each two elements being telescopically received in an associated tube, each spring urging its associated first element into its associated tube and the second of said two elements having a terminal edge in transverse spanning relationship to an associated tube when said one handle member is disposed with its two leg elements of each of said pair of legs in a position other than an aligned position.

* * * * *